(12) United States Patent
Black et al.

(10) Patent No.: US 10,066,675 B2
(45) Date of Patent: Sep. 4, 2018

(54) SYSTEM AND METHOD FOR IMPROVED TRANSMISSION SHIFTING

(71) Applicants: Daniel H Black, Shelby Township, MI (US); Dustin B Skavang, Highland, MI (US)

(72) Inventors: Daniel H Black, Shelby Township, MI (US); Dustin B Skavang, Highland, MI (US)

(73) Assignee: FCA US LLC, Auburn Hills, MI (US)

( * ) Notice: Subject to any disclaimer, the term of this patent is extended or adjusted under 35 U.S.C. 154(b) by 206 days.

(21) Appl. No.: 15/244,033

(22) Filed: Aug. 23, 2016

(65) Prior Publication Data
US 2017/0058968 A1 Mar. 2, 2017

Related U.S. Application Data

(60) Provisional application No. 62/211,145, filed on Aug. 28, 2015.

(51) Int. Cl.
*F16D 25/061* (2006.01)
*F16H 63/30* (2006.01)
(Continued)

(52) U.S. Cl.
CPC ............ *F16D 25/061* (2013.01); *F16D 11/14* (2013.01); *F16H 61/04* (2013.01); *F16H 63/3023* (2013.01); *B60Y 2400/421* (2013.01); *F16D 2011/002* (2013.01); *F16D 2121/04* (2013.01); *F16D 2300/18* (2013.01); *F16D 2500/10462* (2013.01); *F16H 3/66* (2013.01); *F16H 61/686* (2013.01); *F16H 2003/442* (2013.01);
(Continued)

(58) Field of Classification Search
None
See application file for complete search history.

(56) References Cited

U.S. PATENT DOCUMENTS 3,063,529 A * 11/1962 Cook ...................... F16D 23/04
192/48.5
3,690,192 A 9/1972 Bouthors et al.
(Continued)

OTHER PUBLICATIONS

International Search Report and Written Opinion dated Nov. 10, 2016 for International Application No. PCT/US2016/048320, International Filing Date Aug. 24, 2016.

*Primary Examiner* — Mark Alan Manley
(74) *Attorney, Agent, or Firm* — Ralph E. Smith (57) ABSTRACT

A transmission having an input shaft, piston, dog clutch, sensor sleeve and control system is provided. The dog clutch includes male and female members, where one of the members is coupled to the piston for common movement therewith. The sleeve includes a through channel and a reduced diameter sensor portion terminating at a shoulder. The control system is configured to: command a supply of hydraulic fluid against an engagement side of the piston, determine when a terminal end of the sensor portion contacts a control, and determine that the dog clutch members are in a predetermined partially engaged state less than a fully engaged state of the dog clutch members. A length of the reduced diameter sensor portion directly corresponds to the predetermined partially engaged state of the dog clutch that is less than a fully engaged state of the male and female members of the dog clutch.

10 Claims, 6 Drawing Sheets

(51) Int. Cl.

| | |
|---|---|
| *F16H 61/04* | (2006.01) |
| *F16D 11/14* | (2006.01) |
| *F16H 3/44* | (2006.01) |
| *F16H 3/66* | (2006.01) |
| *F16H 61/686* | (2006.01) |
| *F16D 11/00* | (2006.01) |
| *F16D 121/04* | (2012.01) |

(52) U.S. Cl.
CPC .......... *F16H 2003/445* (2013.01); *F16H 2061/0474* (2013.01); *F16H 2200/0065* (2013.01); *F16H 2200/2012* (2013.01); *F16H 2200/2046* (2013.01); *F16H 2200/2064* (2013.01)

(56) References Cited

U.S. PATENT DOCUMENTS

| | | | |
|---|---|---|---|
| 6,000,294 | A | 12/1999 | Jackson et al. |
| 6,098,771 | A * | 8/2000 | Vu ................ F16D 25/0638 192/113.35 |
| 7,419,041 | B2 | 9/2008 | Diemer et al. |
| 8,100,045 | B2 * | 1/2012 | Osborn ............ F15B 15/2815 91/1 |
| 8,721,483 | B2 | 5/2014 | Ziemer et al. |
| 8,894,532 | B2 | 11/2014 | Ziemer |
| 2012/0083373 | A1 | 4/2012 | Ziemer |
| 2012/0083374 | A1 | 4/2012 | Ziemer et al. |
| 2014/0236439 | A1 | 8/2014 | Arnold et al. |

* cited by examiner

| Gear | Brake/Clutch | | | | Dog Clutch | |
| --- | --- | --- | --- | --- | --- | --- |
| | C | D | B | E | F | A |
| 1 | | ● | | | ● | ● |
| 2 | ● | | | | ● | ● |
| 3 | | | ● | | ● | ● |
| 4 | | | | ● | ● | ● |
| 5 | | | ● | ● | | ● |
| 6 | ● | | | ● | | ● |
| 7 | | ● | | ● | | ● |
| 8 | ● | ● | | ● | | |
| 9 | | ● | ● | ● | | |
| R | | ● | ● | | ● | |

SYSTEM AND METHOD FOR IMPROVED TRANSMISSION SHIFTING

CROSS REFERENCE TO RELATED APPLICATION

This application claims the benefit of U.S. Provisional Application Ser. No. 62/211,145, filed Aug. 28, 2015, the contents of which are incorporated herein by reference thereto.

FIELD

The present application relates generally to an automatic transmission and, more particularly, to a system and method for improved shifting in an automatic transmission for a motor vehicle.

BACKGROUND

Some automatic transmissions may include clutches that must be rotationally synchronized before they can be engaged, such as a dog clutch. However, use of such a clutch with the required time for synchronization may require a longer duration of time for clutch engagement to occur, for example, when shifting from Reverse (R) to Drive (D) or when downshifting multiple gears. Thus, while such transmissions and associated clutch systems work for their intended purpose, it is desirable to provide improved shifting performance in an automatic transmission, including a reduced amount of time to command a shift requiring a dog clutch.

SUMMARY

In accordance with an example aspect of the invention, a transmission is provided. In one exemplary implementation, the transmission includes an input shaft, an actuation piston, a dog clutch, a sensor sleeve and a control system. In this exemplary implementation, the actuation piston is disposed in a chamber of the input shaft, where the actuation piston and the chamber are in fluid communication with a hydraulic actuation circuit of the transmission. The dog clutch includes male and female members, where one of the male and female members are coupled to the actuation piston for common movement therewith. The sensor sleeve is disposed in the actuation piston and has i) an internal through channel in fluid communication with the hydraulic circuit, and ii) a reduced diameter sensor portion extending from one end toward the other end of the sleeve and terminating at a shoulder, where the sensor portion extends through an exterior wall of the actuation piston and is movable relative the actuation piston. The control system is configured to: a) upon receipt of a shift command to a gear requiring the dog clutch to be engaged from a disengaged state, command a supply of pressurized hydraulic fluid against an engagement side of the actuation piston thereby causing i) the actuation piston and associated dog clutch member to advance toward an engagement state, and ii) the sensor sleeve to advance in a same direction as the actuation piston until its shoulder engages the exterior wall of the actuation piston; b) determine when a terminal end of the sensor portion contacts a wall of the input shaft chamber, c) upon determining the terminal end of the sensor portion of the sensor sleeve has contacted the chamber wall, determine that the dog clutch male and female dog clutch members are in a predetermined partially engaged state less than a fully engaged state of the dog clutch members; and d) command the transmission to shift to the gear requiring engagement of the dog clutch. A length of the reduced diameter sensor portion of the sensor sleeve from the terminal end to the shoulder directly corresponds to the predetermined partially engaged state of the dog clutch that is less than a fully engaged state of the male and female members of the dog clutch.

In one exemplary implementation, the dog clutch includes a predetermined full engagement position where the male member is received inside the female member for a predetermined amount of axial overlap, and a predetermined partial engagement position corresponding to the predetermined partially engaged state where the male member is received inside the female member for a predetermined amount of axial overlap less than the amount of axial overlap for the predetermined full engagement position.

In one exemplary implementation, the predetermined amount of axial overlap for the predetermined partial engagement position is less than fifty percent of the amount of axial overlap for the predetermined full engagement position. In an exemplary implementation, the amount of axial overlap for the predetermined partial engagement position is approximately 1.5 mm. In an exemplary implementation, an axial length of the reduced diameter portion of the sensor sleeve is approximately 6.5 mm.

In one exemplary implementation, the actuation piston is coupled to male dog clutch member; and a length of the reduced diameter sensor portion of the sensor sleeve is sized to allow for only the predetermined partial engagement position of the male dog clutch member relative to the female dog clutch member corresponding to the predetermined partially engaged state.

In one exemplary implementation, the terminal end of the sensor portion contacting the wall of the input shaft chamber prevents a portion of the commanded supply of pressurized hydraulic fluid from flowing through the through channel and to a valve body of the transmission, thereby signaling that the dog clutch male member is in the predetermined partial engagement position corresponding to the predetermined partially engaged state.

In one exemplary implementation, the commanded supply of pressurized hydraulic fluid against the engagement side of the actuation piston causes the sensor sleeve to advance in the same direction as the actuation piston such that its shoulder engages the exterior wall of the actuation piston before its terminal end contacts the chamber wall. In an exemplary implementation, when the shoulder of the sensor portion of the sensor sleeve engages the exterior wall of the actuation piston, the terminal end of the sensor portion extends beyond a corresponding terminal end of the actuation piston.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

As briefly mentioned above, the present application is directed to a system and method for improved shifting in an automatic transmission. In one exemplary implementation, the present application relates to an improved system and method for determining a predetermined amount of partial movement of a shift element to thereby improve transmission gear shift time and quality. In one exemplary implementation, the shift element is a dog clutch and/or piston coupled to the dog clutch. In this exemplary implementation, partial movement of the dog clutch and/or dog clutch piston corresponds to partial movement of one of the dog clutch members and is determined and/or sensed by a sensing sleeve, as will be discussed in greater detail below.

Today's automatic transmissions often include seven, eight or nine speed transmissions. Some of these transmissions, and in particular an example nine speed transmission, include one or more dog clutches that are required to be engaged or coupled for the transmission to shift certain gears. For example, and with reference to FIGS. 3-4b, an exemplary nine speed transmission includes two dog clutches A and F. For certain transmission shifts, such as a shift from eighth or ninth gear to seventh gear (or below), the dog clutch A is required to be fully engaged form a disengaged state, as can be seen with reference to FIG. 3. As one of ordinary skill in the art will readily appreciate, engagement of a dog clutch means, in one example, engagement of the male and female components of the clutch, such as a male externally splined dog clutch member configured to engage a female internally splined dog clutch member. It will also be appreciated, however, that other dog clutch configurations may be utilized, such as engagement of toothed members.

Such full engagement of the dog clutch requires a period of time that is long enough to be potentially perceived by a driver as too long or undesirable. As a result, it is desirable to provide for improved shift time in transmissions that utilize dog clutches for shifting one or more gears. Accordingly and as discussed in greater detail below, a system and method for providing reduced shift time of certain transmission gears is provided, where such shifting involves engagement of a dog clutch. This system and method will be discussed following a brief discussion of an exemplary nine-speed transmission arrangement.

Referring to FIGS. 1, 3 and 4a-4b, such an exemplary nine-speed automatic transmission for use in a motor vehicle is generally shown and indicated at reference numeral 10. It will be appreciated, however, that the systems and methods discussed herein are not limited to nine-speed automatic transmissions and may be utilized in other transmissions such as, for example, an eight-speed automatic transmission.

Figure 1:
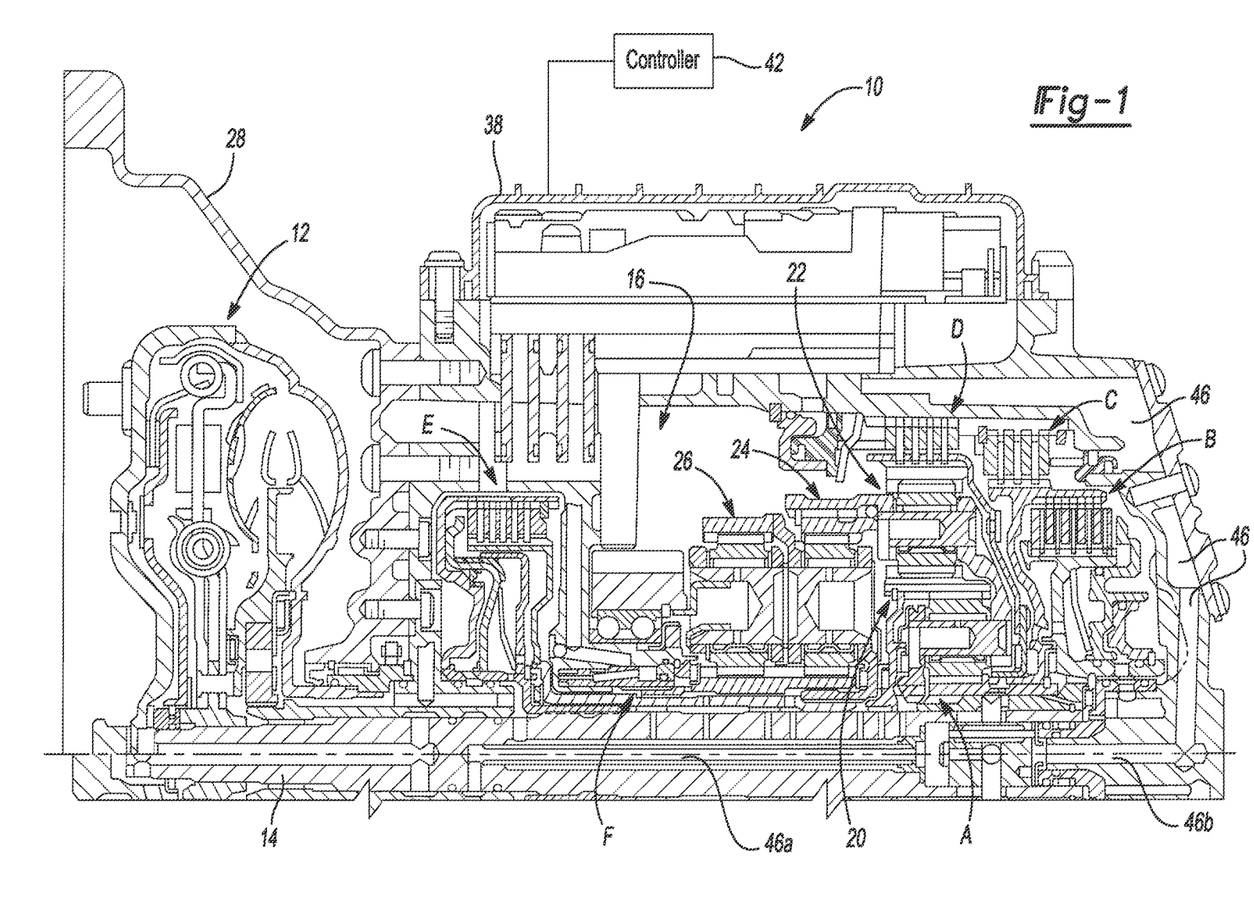
FIG. 1 is a cross-sectional view of an exemplary motor vehicle automatic transmission.
Figure 2:
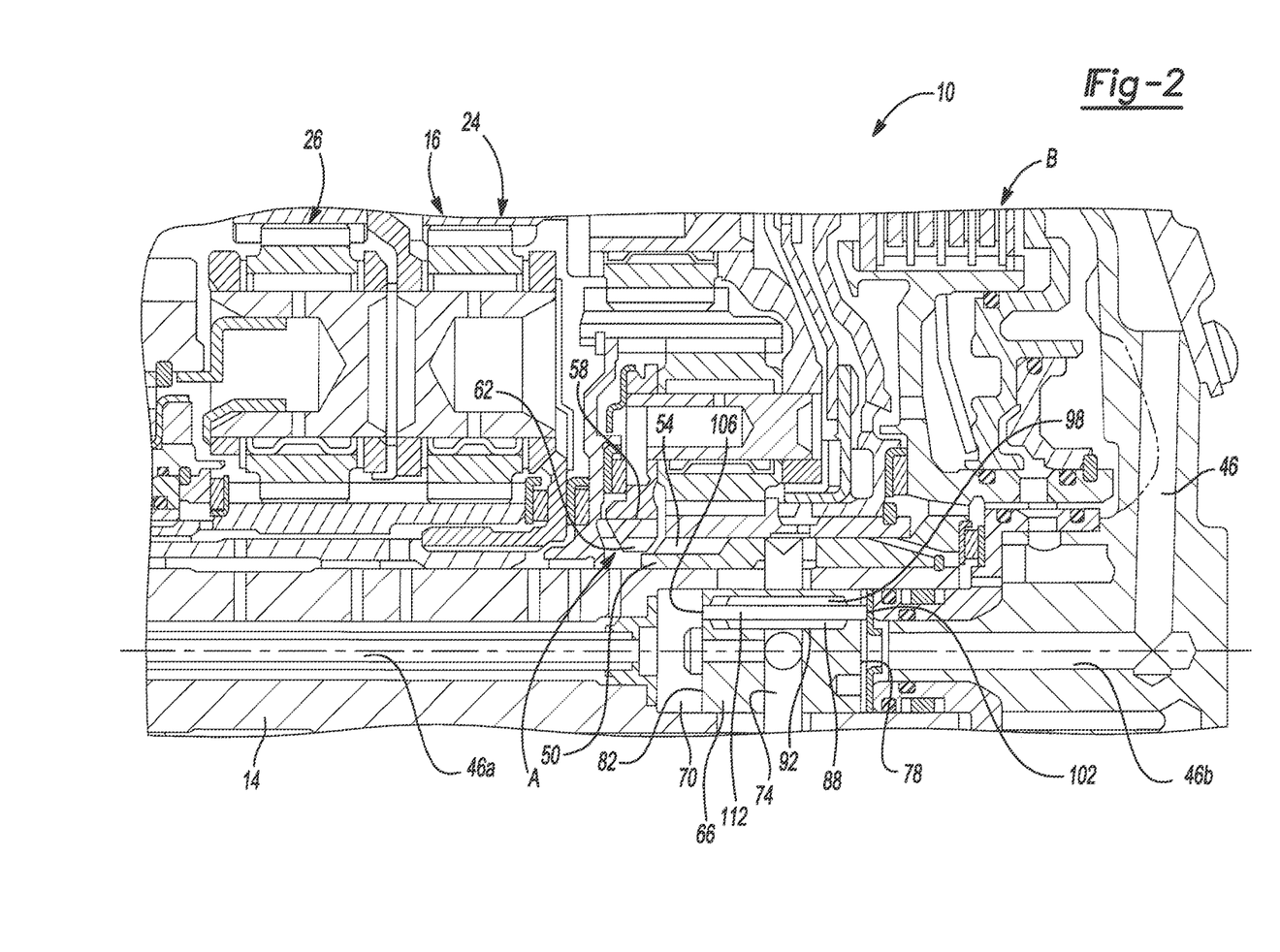
FIG. 2 is an enlarged view of a portion of the cross-sectional view of the exemplary automatic transmission of FIG. 1 and illustrating a dog clutch.

As shown in FIG. 2, the nine-speed automatic transmission 10 is a shift-by-wire transmission and is mechanically coupled to an engine (not shown) through an engine output shaft. Rotational output from the engine output shaft is received by the automatic transmission 10 through a torque converter assembly 12. The torque converter assembly 12 then transfers the rotational output to a transmission input shaft 14 and through one or more gear sets 16 to a transmission output shaft 32, and then on to a drivetrain of the motor vehicle.

The gear set 16 of the automatic transmission 10 includes a first planetary gear set 20, a second planetary gear set 22, a third planetary gear set 24, a fourth planetary gear set 26, and a housing 28. In one exemplary implementation, the first and second planetary gear sets 20, 22 form a shiftable front-mounted gear set, and the third and fourth planetary gear sets 24, 26 form a main gear set. Transmission 10 also includes a valve body 38 in signal communication with a controller or electronic control system 42. Valve body 38 is in fluid communication with a hydraulic circuit 46 that includes various passages for selectively carrying hydraulic fluid to activate and/or deactivate associated clutch elements, as is known in the art.

In the exemplary implementation illustrated, the automatic transmission 10 comprises six shift elements. In particular, automatic transmission 10 includes a first clutch A, a second clutch B, a third clutch E, and a fourth clutch F, as well as a first brake/clutch C and a second brake/clutch D. Clutches B, C, D and E are, in the exemplary implementation illustrated, friction clutches, and clutches A and F are dog clutches. In the example nine-speed automatic transmission 10, selective shifting of nine forward gears and one reverse gear are accomplished with the six shift elements and gear set 16.

Figure 3:
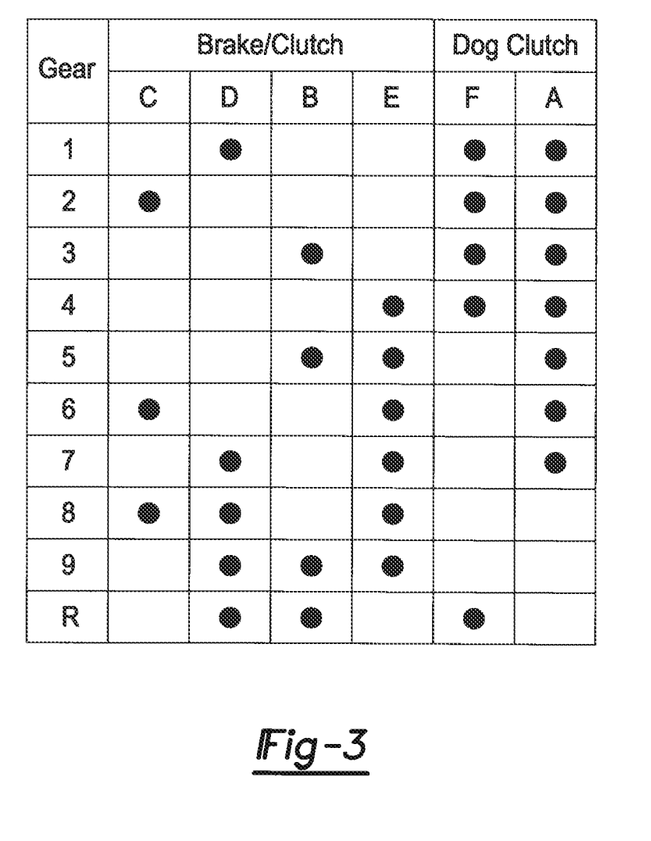
FIG. 3 is a view of a table illustrating engagement of various transmission clutches in connection with shifting of various transmission gears.
Figure 4A:
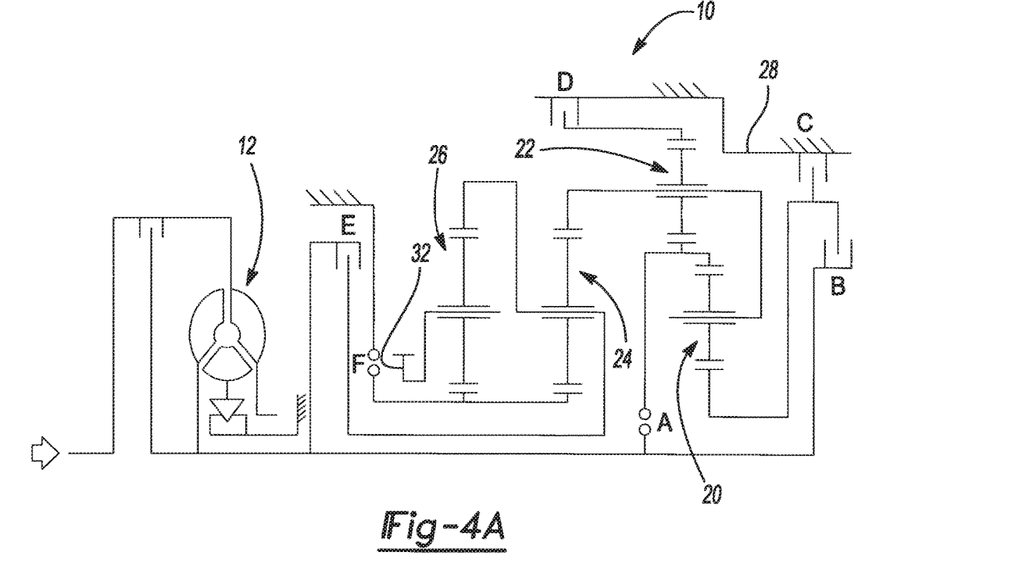
FIG. 4a is a partial schematic illustration of the exemplary automatic transmission of FIG. 1.
Figure 4B:
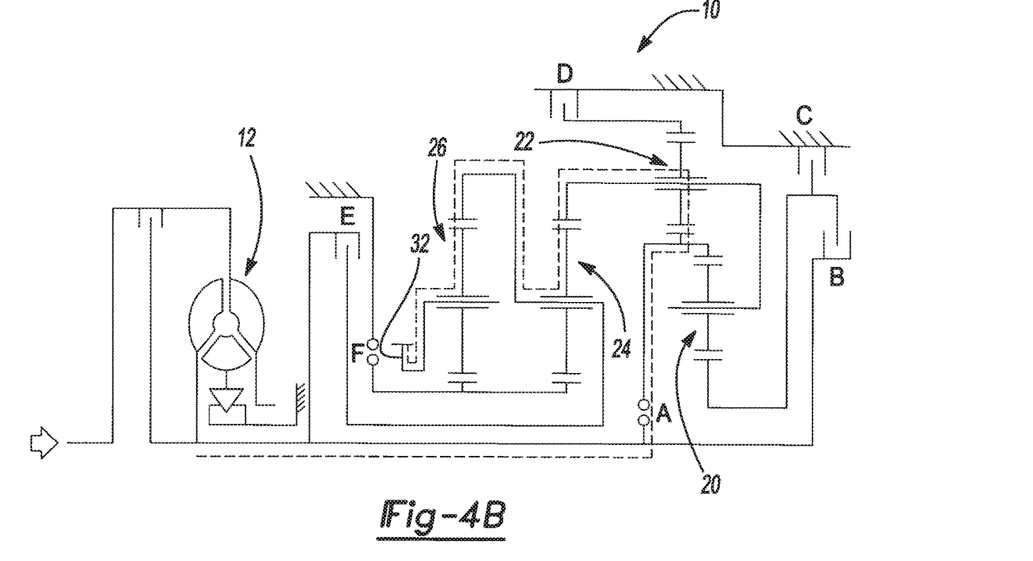
FIG. 4b is the exemplary schematic of FIG. 4a and also illustrating an exemplary power flow.

In particular, and as shown in FIG. 3, the six brakes/clutches A, B, C, D, E and F are selectively engaged in various combinations to provide the nine forward gear ratios and reverse (R) in connection with the components of gear set 16. For example, clutch D as well as dog clutches A and F are engaged to provide power flow for first gear, as shown in FIG. 4b with reference to FIGS. 1 and 3. For the exemplary transmission 10, dog clutch F is activated/engaged with or substantially in connection with an engine-start procedure of the associated vehicle and, for first gear when a garage shift to drive is requested, clutches D and A are then activated/engaged. Activation or engagement of dog clutch A is also required for shifting from eighth or ninth gear to seventh gear or lower. It will also be appreciated that engagement of the dog clutch A is required for garage shifts (i.e., park-to-drive, neutral-to-drive or reverse-to-drive).

Dog clutch A and associated components will now be discussed in greater detail in connection with the system and method for providing reduced shift time of certain forward gears requiring engagement of dog clutch A. In one exemplary implementation, the dog clutch A includes a male externally splined clutch member 50 having external splines 54 and a female internally splined clutch member 58 having internal splines 62. The male clutch member 50 is configured to move relative to the female clutch member 58 between an engaged position where the male clutch member splines 54 engage the female clutch member splines 62 for common rotation, and a disengaged position where the male and female clutch members 50, 58 are separated from each other such that rotary force is not transmitted from the male clutch member 50 to the female clutch member 58.

Movement of the male clutch member 50 is provided by an actuation piston 66, which in the exemplary implementation illustrated, is housed in a chamber 70 inside or substantially inside the input shaft 14. A connecting pin 74 positioned generally transverse to a longitudinal length of the piston 66 connects the piston 66 to the male clutch member 50. Piston 66 includes a first or engagement side 78 and a second opposite disengagement side 82. Sides 82 and 78 are in communication with hydraulic passages 46a and 46b, respectively, of hydraulic circuit 46, as shown for example in FIGS. 2 and 6.

Figure 6:
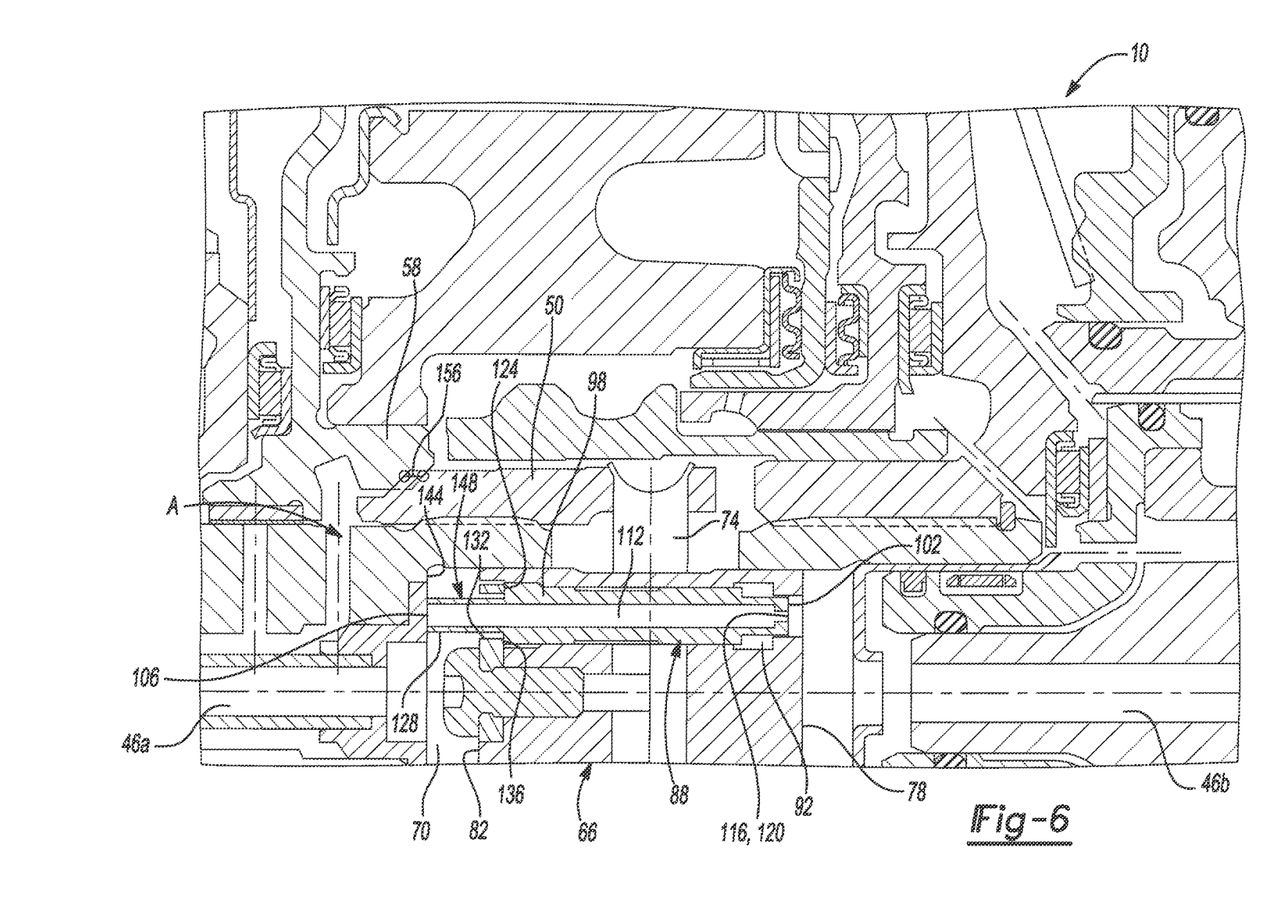
FIG. 6 is a partial cross sectional view of the automatic transmission of FIG. 1 and showing a dog clutch A sensing sleeve and the dog clutch A in an exemplary partial engagement position.

A sensing member 88, such as a sensing sleeve, is slidably positioned or housed in an internal channel 92 defined by the dog clutch A piston 66, as can also be seen, for example, in FIGS. 2 and 6. The sensing sleeve 88 includes a body 98 having a first end 102, and an opposite second end 106. The second end 106 of sleeve 88 is positioned proximate and moves relative to the disengagement side 82 of the piston 66, and the first end 106 is positioned proximate and moves relative to the engagement side 78 of the piston 66, as also shown in FIGS. 2 and 6. The sensing sleeve 88 defines a hollow interior or internal channel 112 extending therethrough from the first end 102 to the second end 106. The internal channel 112 includes or defines an orifice 116 (e.g., FIG. 6) at the first end 102 defining an entrance 120 to the internal channel 112 for hydraulic fluid flow in connection with an operation to engage dog clutch A. The orifice 116 is of a predetermined size to provide for a pressure drop and controlled flow of fluid through the internal channel 112, as discussed below in greater detail.

The body 98 of sensing sleeve 88 includes an external shoulder 124 formed at an end of a reduced diameter or necked-down portion 128 at the second end 106 thereof, as shown in FIG. 6. The reduced diameter portion 128 extends from the second end 106 to and forms the shoulder 124 at an opposite end of portion 128, as shown for example in FIGS. 2 and 6. The reduced diameter portion 128 is configured to slide relative to and through an opening 132 formed in an end wall 136 of piston 66 and/or channel 92. In other words, the reduced diameter portion 128 of sensing sleeve 88 may slide through opening 132 until shoulder 124 engages an internal side of wall 136, as shown for example in FIG. 6.

When the dog clutch A is to be engaged, pressurized hydraulic fluid at a predetermined pressure is controllably provided via valve body 38 through command of controller 42 via hydraulic circuit 46 and particularly to passage 46a so as to flow against the engagement side or control surface 78 of the dog clutch A piston 66. The pressurized hydraulic fluid is configured to force the dog clutch piston to axially slide or advance relative to chamber 70, which causes the coupled male sliding dog clutch A member 50 to advance into engagement with the female internally splined dog clutch A member 58, as shown for example in FIGS. 5 and 6.

As briefly discussed above, the dog clutch A hydraulic control circuit includes a control circuit and/or flow path where pressurized fluid may flow from the valve body 38 to and against the first end 102 of the sensing sleeve 88 and the engagement side 78 of the dog clutch piston 66. A portion of such fluid in the circuit flows through the sensing sleeve orifice 116 and into the sensing sleeve channel 112 and then out of the channel 112 at its second end 106. Upon exiting the sensing sleeve at end 106, this portion of the fluid flows into passage 46a of hydraulic circuit 46 which is in communication with the valve body 38, where a pressure sensor or the like detects or senses the pressure of the fluid flowing from the sensing sleeve 88 to the valve body 38 via channel 112 and passage 46a.

When the pressurized hydraulic fluid is provided in the dog clutch A circuit in the manner discussed above, the pressurized fluid flowing against the first end 102 of the sensing sleeve 88 forces the sensing sleeve 88 to axially advance in a similar manner as the dog clutch A piston 66 while also allowing for the small, predetermined amount of hydraulic fluid (at a lower pressure due to the orifice 116) to flow into and through the internal channel 112 of the sensing sleeve 88 via the orifice 116.

This fluid in the sensing sleeve internal channel 112 then flows through the sensing sleeve 88 and into the circuit passage 46a in the manner discussed above, until the second end 106 of the sensing sleeve 88 engages and seals against a control wall or surface 144 associated with the piston 66 and chamber 70, which prevents or substantially prevents further fluid flow through the sensing sleeve 88 and into the passage 46a. As a result, the pressure in the passage falls to zero or near zero and is sensed by the associated pressure sensor of valve body 38.

When this happens (i.e., the flow of fluid through the sensing sleeve internal channel 112 stops or substantially stops with engagement and sealing of the sensing sleeve second end 106 with the control wall 144), the controller 42 determines that there is full or complete dog clutch piston 66 movement and thus full engagement of the dog clutch A members 50, 58. Once this is determined, the transmission may then proceed with the requested shift that requires use of the dog clutch A, such as the shift from eighth or ninth gear to seventh or a lower gear.

In an exemplary implementation, it has been discovered that shift time may be improved by reducing the amount of movement of the dog clutch A piston 66 travel, which corresponds to partial engagement of the dog clutch A. By reducing the amount of travel of the dog clutch piston A and thus the male sliding dog clutch A member 50, less time is required for positioning the dog clutch A into a predetermined engagement position for shifting of the transmission from ninth or eighth gear to the seventh or lower gear.

While it would be possible to use a position sensing electronic sensor to determine the position of the dog clutch piston and whether the dog clutch piston has reached a predetermined partial engagement position, such as shown in FIG. 6 (as compared to FIG. 5), such a sensor requires valuable packaging space within the transmission as well as can add notable cost to the transmission assembly. As a result, such a sensor may be undesirable.

Advantageously, it has been determined that the sensing sleeve 88 may be configured to sense when the dog clutch piston 66 has traveled to a predetermined partial engagement position suitable for shifting the transmission when the dog clutch A is required. As will be discussed in greater detail below, the sensing sleeve 88 is configured and specifically sized to provide for piston 66 movement corresponding to only a predetermined partial engagement of dog clutch A. Such an arrangement is shown, for example, in FIG. 6 and includes the reduced diameter portion 128 at the second end 106 configured to engage the control wall 144 when the piston 66 has traveled or advanced only to the predetermined partial engagement position, which is less than full engagement of the dog clutch A splined members 50, 58.

Figure 5:
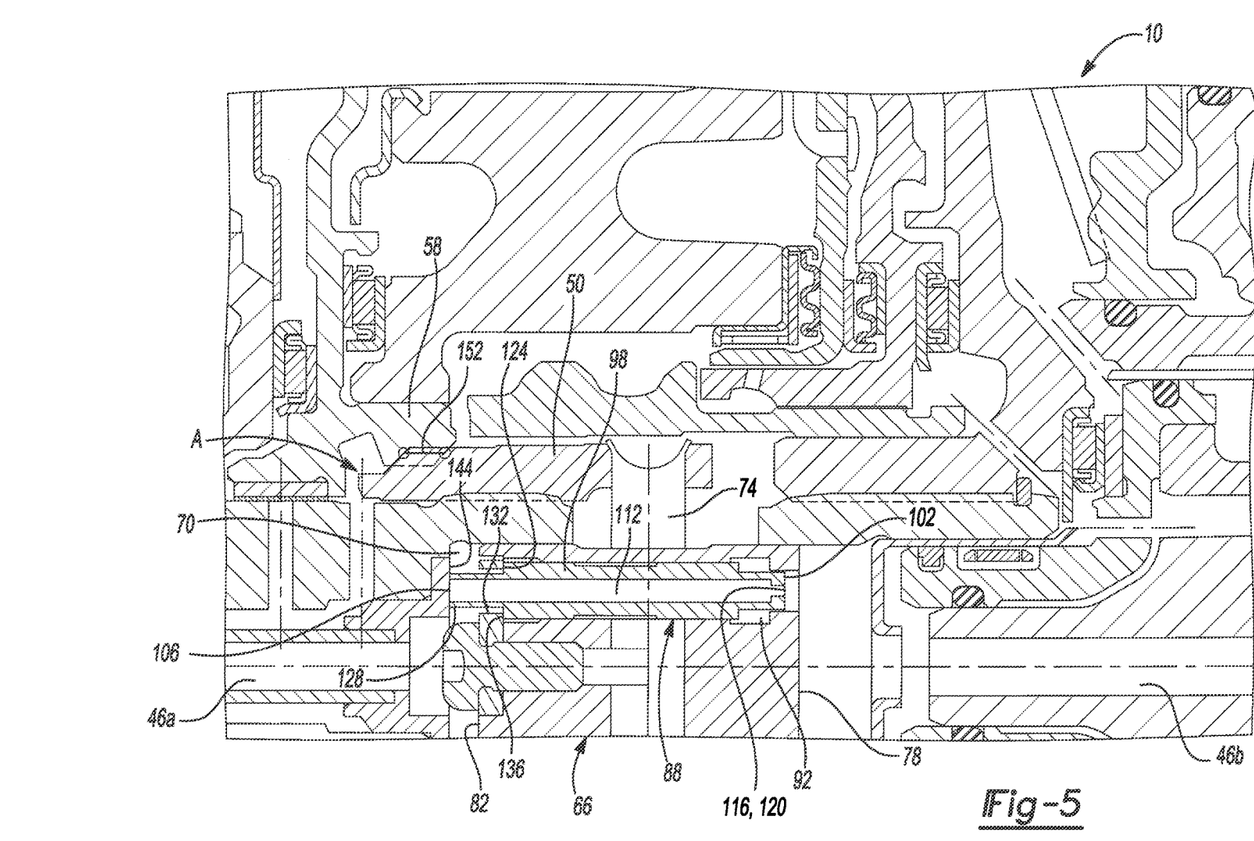
FIG. 5 is a partial cross sectional view of the exemplary automatic transmission of FIG. 1 and showing a dog clutch A sensing sleeve and the dog clutch A in an exemplary engagement position.

With particular reference to FIG. 6 and continuing reference to FIG. 5, the reduced diameter portion 128 of the sensing sleeve is specifically sized to have the second end 106 thereof contact the control wall 144 at a predetermined travel or advancement position of piston 66 corresponding to the desired partial engagement of dog clutch A splined members 50, 58. A comparison of the sensing sleeve of FIG. 6 with the sensing sleeve of FIG. 5 shows the sensing sleeve of FIG. 6 includes a longer sensing portion 148 (reduced diameter portion 128) such that the male dog clutch member 50 advances from a disengaged position or state (see FIGS. 1 and 2) to only a predetermined partial engagement position or state relative to female clutch member 58 (FIG. 6) that is less than a predetermined full engagement position or state relative to female clutch member 58 (FIG. 5). As can be seen from FIGS. 2, 5 and 6, an amount of axial overlap of the splines 54, 62 in the partial engagement position of FIG. 6 is less than an amount of axial overlap of the splines 54, 62 in the full engagement position of FIG. 6. In one exemplary implementation, the amount of axial overlap 152 in the full engagement position is approximately between 3.0 mm and 3.5 mm as compared to the axial overlap 156 in the partial engagement position, which is between 1.4 and 1.7 mm and preferably, in an exemplary implementation, 1.5 mm. In one exemplary implementation, the amount of axial overlap in the partial engagement position is approximately 45 or 50 percent of the axial overlap in the full engagement position.

When the pressurized fluid is provided to the dog clutch A control circuit in the manner discussed above, the sensing sleeve 88 is urged forward by the pressure on or against its first end 102 while a portion of the pressurized fluid flows through the orifice 116. The pressure on the first end of the sensing sleeve 88 and the lower force required to move the same relative to the piston 66, translates the sensing sleeve 88 forward in the channel 112 at a faster rate than movement of the dog clutch A piston 66 in the same direction. In other words, while the piston 66 and sensing sleeve 88 are both translated forward due to the pressurized fluid in the dog clutch A control circuit, the sensing sleeve 88 moves at a different (i.e., faster) speed and thus relative to the dog clutch A piston 66.

In this operation, sensing sleeve 88 will move relative to the piston 66 such that the reduced diameter portion 128 moves through the opening 132 in piston wall 136 until shoulder 124 engages wall 136. In an exemplary implementation, this sensing sleeve 88 movement (i.e., shoulder 124 moved into engagement with wall 136) occurs before the terminal end 106 of sensing sleeve 88 contacts control wall or surface 144. The piston 66 will advance thereby advancing male clutch member 50 into engagement with female clutch member 58 until the terminal end 106 of sensing sleeve engages wall 144, which corresponds to the predetermined partial engagement of dog clutch A.

At this point, the controller 42 senses that the hydraulic pressure in circuit passage 46a is at or below a predetermined threshold, such as zero or substantially zero, and determines that the dog clutch A is in the predetermined partial engagement position and controls the transmission 10 to shift into the desired gear requiring engagement of dog clutch A. As the sensing or reduced diameter portion 128 is longer for the implementation shown in FIG. 6 and configured to correspond specifically to the desired partial engagement of clutch members 50, 58, the dog clutch A piston 66 and thus the male dog clutch A member will advance or travel less thereby requiring less clutch engagement time and a faster shift time for transmission 10. As a result, the sensing sleeve with the longer sensing portion shown in FIG. 6 provides for partial engagement of the dog clutch A and the ability to accurately sense the same and thereby provide faster shift times without requiring a dedicated electronic position sensor.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A transmission, comprising:
an input shaft;
an actuation piston disposed in a chamber of the input shaft, the actuation piston and the chamber in fluid communication with a hydraulic actuation circuit;
a dog clutch having male and female members, wherein one of the male and female members are coupled to the actuation piston for common movement therewith;
a sensor sleeve disposed in the actuation piston and having i) an internal through channel in fluid communication with the hydraulic circuit, and ii) a reduced diameter sensor portion extending from one end toward the other end of the sleeve and terminating at a shoulder, the sensor portion extending through an exterior wall of the actuation piston and movable relative the actuation piston;
a control system configured to:
upon receipt of a shift command to a gear requiring the dog clutch to be engaged from a disengaged state, command a supply of pressurized hydraulic fluid against an engagement side of the actuation piston thereby causing i) the actuation piston and associated dog clutch member to advance toward an engaged state, and ii) the sensor sleeve to advance in a same direction as the actuation piston until its shoulder engages the exterior wall of the actuation piston;
determine when a terminal end of the sensor portion contacts a wall of the input shaft chamber;
upon determining the terminal end of the sensor portion of the sensor sleeve has contacted the chamber wall, determine that the dog clutch male and female dog clutch members are in a predetermined partially engaged state less than a fully engaged state of the dog clutch members; and
command the transmission to shift to the gear requiring engagement of the dog clutch;
wherein a length of the reduced diameter sensor portion of the sensor sleeve from the terminal end to the shoulder directly corresponds to the predetermined partially engaged state of the dog clutch that is less than a fully engaged state of the male and female members of the dog clutch.

2. The transmission of claim 1, wherein the dog clutch includes a predetermined full engagement position where the male member is received inside the female member for a predetermined amount of axial overlap, and a predetermined partial engagement position corresponding to the predetermined partially engaged state where the male member is received inside the female member for a predetermined amount of axial overlap less than the amount of axial overlap for the predetermined full engagement position.

3. The transmission of claim 2, wherein the actuation piston is coupled to male dog clutch member and wherein a length of the reduced diameter sensor portion of the sensor sleeve is sized to allow for only the predetermined partial engagement position of the male dog clutch member relative to the female dog clutch member corresponding to the predetermined partially engaged state.

4. The transmission of claim 3, wherein the terminal end of the sensor portion contacting the wall of the input shaft chamber prevents a portion of the commanded supply of pressurized hydraulic fluid from flowing through the through channel and to a valve body of the transmission, thereby signaling that the dog clutch male member is in the predetermined partial engagement position corresponding to the predetermined partially engaged state.

5. The transmission of claim 3, wherein the predetermined amount of axial overlap for the predetermined partial engagement position is less than fifty percent of the amount of axial overlap for the predetermined full engagement position.

6. The transmission of claim 5, wherein the amount of axial overlap for the predetermined partial engagement position is approximately 1.5 mm.

7. The transmission of claim 6, wherein an axial length of the reduced diameter portion of the sensor sleeve is approximately 6.5 mm.

8. The transmission of claim 3, wherein the commanded supply of pressurized hydraulic fluid against the engagement side of the actuation piston causes the sensor sleeve to advance in the same direction as the actuation piston such that its shoulder engages the exterior wall of the actuation piston before its terminal end contacts the chamber wall.

9. The transmission of claim 8, wherein when the shoulder of the sensor portion of the sensor sleeve engages the exterior wall of the actuation piston, the terminal end of the sensor portion extends beyond a corresponding terminal end of the actuation piston.

10. The transmission of claim 1, further comprising an absence of an additional position sensor for measuring a position of the dog clutch male member relative to the dog clutch female member.

\* \* \* \* \*